(12) United States Patent
Goldberg

(10) Patent No.: US 7,975,404 B2
(45) Date of Patent: Jul. 12, 2011

(54) STIFFENERS FOR USE IN FOOTWEAR

(75) Inventor: Bruce Goldberg, Clifton, NJ (US)

(73) Assignee: Stanbee Company, Inc., Carlstadt, NJ (US)

( * ) Notice: Subject to any disclaimer, the term of this patent is extended or adjusted under 35 U.S.C. 154(b) by 35 days.

(21) Appl. No.: 11/159,688

(22) Filed: Jun. 23, 2005

(65) Prior Publication Data
US 2006/0003160 A1 Jan. 5, 2006

Related U.S. Application Data

(60) Provisional application No. 60/584,519, filed on Jul. 1, 2004, provisional application No. 60/640,947, filed on Dec. 30, 2004.

(51) Int. Cl.
A43B 13/42 (2006.01)
A43B 23/08 (2006.01)
B32B 7/12 (2006.01)

(52) U.S. Cl. ......... 36/68; 36/69; 36/76 C; 36/77 M; 428/343; 428/354

(58) Field of Classification Search .......... 428/349, 428/347, 354, 343
See application file for complete search history.

(56) References Cited

U.S. PATENT DOCUMENTS

| | | | |
|---|---|---|---|
| 3,523,103 A | 8/1970 | Zemlin | |
| 3,590,411 A | 7/1971 | Zemlin | |
| 3,616,170 A * | 10/1971 | Closson, Jr. | ............ 442/76 |
| 3,647,616 A | 3/1972 | Zemlin | |
| 3,891,785 A | 6/1975 | Zemlin | |
| 3,973,285 A | 8/1976 | Babson et al. | |
| 4,814,037 A | 3/1989 | Arnold | |
| 4,946,743 A | 8/1990 | Winter | |
| 5,192,612 A | 3/1993 | Otter et al. | |
| 5,532,066 A | 7/1996 | Latiolais et al. | |
| 5,712,031 A * | 1/1998 | Kelch et al. | ........ 428/355 BL |
| 6,299,962 B1 * | 10/2001 | Davis et al. | ............. 428/98 |
| 6,391,380 B1 | 5/2002 | Goldberg | |
| 6,475,619 B2 | 11/2002 | Goldberg | |
| 2003/0170453 A1 | 9/2003 | Foss et al. | |
| 2004/0209097 A1 | 10/2004 | Willham et al. | |
| 2007/0055205 A1 * | 3/2007 | Wright et al. | ............ 604/174 |

FOREIGN PATENT DOCUMENTS

| | | |
|---|---|---|
| CN | 1312165 | 9/2001 |
| EP | 0 364 301 | 4/1990 |
| FR | 2 623 980 | 6/1989 |
| GB | 2 291 880 | 2/1996 |
| GB | 2 291 880 A * | 2/1996 |
| JP | 03185051 | 8/1991 |
| JP | 2004351634 | 12/2004 |
| WO | WO 97/38060 | 10/1997 |
| WO | WO 00/30485 | 6/2000 |
| WO | WO 00/41585 | 7/2000 |
| WO | 0172162 A1 | 10/2001 |
| WO | WO 01/72162 | 10/2001 |
| WO | WO03066329 A1 * | 8/2003 |

* cited by examiner

Primary Examiner — Callie E Shosho
Assistant Examiner — Anish Desai
(74) Attorney, Agent, or Firm — Gerald E. Hespos; Michael J. Porco

(57) ABSTRACT

The present invention relates to a process and composition for stiffening materials for use in the manufacturing of footwear using a combination of stiffeners and adhesives.

10 Claims, No Drawings

STIFFENERS FOR USE IN FOOTWEAR

This application claims priority on U.S. Provisional Patent Appl. No. 60/584,519, filed Jul. 1, 2004 and U.S. Provisional Patent Appl. No. 60/640,947, filed Dec. 30, 2004.

BACKGROUND OF THE INVENTION

1. Field of the Invention

The invention relates to stiffeners, such as the stiffeners used in the manufacture of shoes to retain the shape of heel and toe portions of the footwear.

2. Description of the Related Art

There are a number of different types of stiffeners used in the shoe industry. U.S. Pat. Nos. 3,523,103; 3,590,411; 3,647,616; 3,891,785; 3,973,285; 4,814,037; 6,391,380 and 6,475,619 disclose methods and materials for improving the stiffness and adhesive qualities of materials for use in the footwear industry (all of which are incorporated by referenced). The stiffening plastic resins are selected from styrene butadiene, polystyrene, polyvinylacetate, acrylic as well as other polymer lattices that may be saturated into a needle punch non woven fabric. Some of these types of stiffeners have hot melt adhesives coated onto their surfaces and are heat activated to bond to the shoe upper and lining. Some are activated with solvents and do not have heat activated hot melt adhesives. A second group of stiffeners are premolded materials made from polyvinylchloride, ionomers or thermoplastic rubbers (TPR). These premolded stiffeners require an adhesive to be painted on the surface for bonding to the shoe components. There are stiffeners that are made via extrusion of a resin such as an ionomer or other thermoplastic polymers and then require an extrusion coating of an adhesive onto the polymer sheet. The last category comprises stiffeners that are made from powders that are admixtures of a filler or hard material with an adhesive or softer material. These polymer powder blends are then heat sintered to produce a stiffener.

The ideal characteristic of the stiffener is to have high resiliency and good stiffness for a given weight of material. The saturated stiffeners can be made stiff but usually the stiffer grades do not have high resiliency. The saturated stiffeners, the premolded stiffeners and the extruded stiffeners all require an extra processing step to have an adhesive applied to the surface. The powder coated stiffeners usually involve a need for cryogrinding to be able to create a fine powder from a low melting point adhesive which results in added costs as well as a need for a critical particle size distribution. The powder coated materials, since they are sintered, are also less tough or strong and need extra weight for a given level of stiffness since the sintering action does not form a true melt of the material to maximize the physical properties. These materials also need high levels of the adhesive component in order to get good bonding to the various substrates that they will be attached to. This adds additional cost and additional weight. When hot melting the saturated materials or the extruded materials they need a significant amount of hot melt adhesive to be coated onto their surfaces in a separate step.

There are processes and products that are used in the packaging industry where a tie layer of adhesive is added to another resin to produce a very thin layer to bond these various layers together. Usually this is done with adhesive tie layers in which the adhesive component is similar in melt viscosity and melting point to the other layers. The process to produce these materials is an extrusion process that uses multiple extruders and either a multicomponent die block or a manifold die.

SUMMARY OF THE INVENTION

The present invention overcomes a number of the deficiencies listed above. The present invention uses a combination of a stiffening plastic resin such as polymers of polyethylene terephthalate glycol (PETG) copolyester and low melting point plastic adhesive resins such as polycaprolactone, to form a polymer sheet stiffener that has both stiffening properties and adhesive properties in one step. The polymers of PETG copolyester and polycaprolactone may be combined in various manners to obtain the desired stiffening and adhesive properties.

Additional stiffening plastic resins are known in the art, examples are styrene resins, styrene-butadiene resins, vinyl acetate resins, vinyl chloride resins, acrylic resins, extruded thermoplastic or powder coated thermoplastic materials which may be selected from the group consisting of polyvinyl chloride, ionomers, high, medium or low density polyethylene, polypropylene, polyesters, polystyrene and copolymers and compatible blends of such polymers. Examples of commercially available stiffeners are PETG, PET and copolyesters, such as, but not limited to, GP001 polyester, all of which are available from Eastman Chemicals.

GP001 is a copolyester with a vicat softening temperature of 74° C. and a glass transition temperature of 75° C. At a thickness of 10 mils, a film of GP001 copolyester exhibited a density of 1.30 g/m$^3$, an Elmendorf tear resistance of 7.5 N (M.D. and T.D.), a PPT tear resistance of 61 (M.D.) and 66N (T.D.), a tensile strength at break of 53 Mpa (7600 psi at M.D. and T.D.), a tensile modulus of (M.D.) 1570 Mpa ($2.3 \times 10^5$ psi) and (T.D.) 1560 ($2.3 \times 10^5$ psi), a dart impact at 23° C. of 355 g, an elongation at break of 5% (M.D. and T.D.), a Tear Propagation Resistance, Split Tear Method (at 254 mm/min) (M.D. and T.D.) of 15.7N. The GP001 Mechanical properties for injection molding are as follows, tensile stress at break of 3200 psi, tensile stress at yield of 7400 psi, and elongation at break of 184%, a tensile modulus of $3.3 \times 10^5$ psi, a flexural yield strength of 10600 psi.

Polycaprolactone has good water, oil, solvent and chlorine resistance. It has a low melting-point (58-60° C.) and low viscosity, and it is easy to process. Additional low melting point plastic adhesive resins, such as plastic resins with a melting point below 85° C. can also be employed in the present invention. An additional low melting point plastic adhesive resin is ethylene methyl acrylate copolymer, sold commercially as 2260 EMAC by Eastman Chemicals. 2260 EMAC has a melting point of 76° C.

EMAC 2260 is ethylene methyl acrylate copolymer with a melt index of 2.1 g/10 min., a density of 944 kg/m$^3$, a vicat softening temperature of 50° C., a brittleness temperature of <−73° C., a durometer hardness (Shore D Scale) of 37, a methyl acrylate content of 24%, a tensile stress at break (500 mm/min) of 11 Mpa, and an elongation at break (500 mm/min) of 835%, and a melting point of 76-77° C.

The stiffener may be evaluated to determine the adhesive bonding strength of the finished product by die cutting a piece of the stiffener to be tested and inserting the stiffener between two pieces of a non-woven lining material that is a 35% poly ester blend having a thickness of 0.029 inches. The three pieces are held together and placed into a back part heel counter molding machine with the female mold at 180° F. and the male mold at 290° F. The mold is closed and held in position for 17 seconds. The mold is opened and the laminate is placed, at room temperature, in a laminate cooling station having the desired shape of the final product. The shaped heel counter is now rigid and the stiffener is bonded to the two pieces of non-woven lining material. The adhesive test requires that the three part laminate remain bonded together when manual pressure is applied to pull the components apart. This determines if the stiffening material has good adhesive qualities. The resiliency test is based on making a thumb indent on the side of the heel counter and evaluating the degree with which the indent bounces back. An acceptable bounce is when the indent bounces back immediately with a "ping-pong" sound. This determines if the stiffening material is resilient.

One process involves co-extruding with either a coextrusion block or a manifold die using polymers of PETG copolyester with adhesives such as polycaprolactone, to form a polymer sheet stiffener that has both stiffening properties and adhesive properties in one step. The uniqueness of the process and the material is that it allows for two materials of significantly different melting points and viscosity to form a sheet material in one step. These sheets can then be heat activated to form a bond with the shoe components when heated and molded and at the same time produce a stiff material depending on the ratio of the ingredients and their weight. The formulation produces a stiff material with high resiliency and toughness. The two unique characteristics of this product and process are the fact that they can coextrude and form an acceptable sheet from two highly different melt index and melting point materials. Additionally it is more cost effective to perform in one step what usually takes two steps and at the same time it is possible to use a smaller amount of the adhesive resin since it all sits on the two outer surfaces of the sheet. It is also possible to use regrind in place of virgin polymer.

A second process involves mixing polymer blends of copolyester with adhesives, such as a polycaprolactone to form a dry mixture in a continuous mixer or an extruder. This results in a polymer sheet stiffener that has both stiffening properties and adhesive properties in a single step. The unique process and the material allows for two materials of significantly different melting points to form a homogeneous mix. These sheets can then be heat activated to form a bond with the shoe components when heated and molded and at the same time produce a stiff material depending on the ratio of the ingredients and their weight. The formulation produces a stiff material with high resiliency and toughness.

DETAILED DESCRIPTION OF THE PREFERRED EMBODIMENTS

The copolyester of the coextruded stiffener preferably is the Eastman Chemical Eastar 6763, which has a softening point of 85° C. (185° F.) and is usually extruded into a film at extrusion temperatures of 246-274° C. (475-525° F.). The adhesive preferably is a polycaprolactone and most preferably Dow Chemical Tone 767 (Tone) which has a melting point of 60° C. (140° F.) and a melt flow of 1.9 or Tone 787 with a melt index of 0.5. The melt index is determined via ASTM D1238-73, which is run at 80° C. and at 44 psi and measured in g/10 min. The PETG has a flex modulus of 300,000 psi and the Tone has a flex modulus of 63,000 psi. Therefore, the PETG is the component that adds stiffness to the material and varying its level will vary the level of stiffness. The Tone normally extrudes at 93-120° C. (200-250° F.). The uniqueness of the process and the product is the fact that these two materials are brought together in the die and they maintain their integral integrity. The Tone remains on the outer surfaces as an adhesive and the PETG forms the internal core to add the stiffness quality.

While the two materials listed above are illustrated one is not limited to these materials and one could coextrude PET polyester as the core or iononmer and use the above adhesive, ethylene vinyl acetate adhesives, ethylene methacrylate adhesives or copolyesters.

The below examples resulted in several novel discoveries. The manifold die works well forming an "ABA" structure wherein the adhesive is on both sides of the polymer stiffener. The PETG regrind does not need to be dried under environmental conditions 75° F. and less than 50% humidity. The Tone can run at higher temperatures without too much reduction in viscosity and still results in a good coating. The casting rolls can be run at a temperature of about 55° F. The use of higher temperatures at the die, the Tone feed pipes and the extruder reduces and/or eliminates the potential of score die lines. These lines come from the adhesive coating and not from the stiffener polymer. The use of a flex lip die and the 100 mesh screen pack help in giving a better surface and minimize contamination. A cast roll works well, but these rolls do not allow for gauge control. The gauge control occurs from the extruder speed and the die opening. There is a limitation on how much turn down one can get with a single die lip, and die modifications can be made to increase the turn down. Good bonds occurred with the Tone coating and the Tone coating stayed on the polymer surfaces even at higher temperatures. Good bonds occurred with the 90/10 PETG/Tone ratio even at lower weights where the Tone layers were less than 50 g/m². PET regrind that is dried will also work on in the present invention with the Tone even though it has to be extruded at much higher extrusion temperatures and higher die temperatures. The polyethylene terephthalate (PET) required at least 550° F. for the PET extruder, which then resulted in good Tone flow and good bonding.

The following examples illustrate the process and the materials produced.

Examples 1-9 related to the process of mixing the polymer stiffener and the adhesive material to produce a polymer sheet stiffener in a single mixing and/or extruding step.

EXAMPLE 1

The copolyester is a PETG copolyester, specifically Eastman Chemical Eastar 6763 and the adhesive is a polycaprolactone, specifically Tone 767. The materials have significantly different properties that can be made homogeneous by processing them through a READCO continuous mixer (READCO Company, York, Pa.) at temperatures in the range of 380-400° F. This equipment does not require a powder form of the material and allows for the dissimilar materials to form a homogeneous melt that will produce a tough, stiff and adhesive activated sheet of material. 40 parts of Tone 767 and 60 parts of PETG copolyester were fed separately into a READCO 2 inch continuous mixer with the temperatures set at 375° F. and the slot die at 425° F. The feed rate was 60 lbs/hr at a screw speed of 150 rpm. The resulting sheet was passed through a set of cooling rolls to produce a sheet with a thickness of 40-43 mils.

EXAMPLE 2

This example had the same conditions as Example 1 except 50 parts of Tone and 50 parts of PETG were fed into the mixer to produce the same thickness sheet.

EXAMPLE 3

This example had the same conditions as Example 1 except that 60 parts of Tone and 40 Parts of PETG were used to produce a sheet in the range of 40-43 mils.

EXAMPLE 4

This example had the same conditions as Example 1 except 60 parts of Tone and 40 parts of PETG were used to produce a sheet of approximately 60 mils in thickness.

EXAMPLE 5

This example had the same conditions as Example 1 except that 50 parts of Tone and 50 parts of PETG were used to produce a sheet that was 60 mils thick.

EXAMPLE 6

This example had the same conditions as Example 1 except that 40 parts of Tone and 60 parts of PETG were used to produce a sheet that was 60 mils thick.

EXAMPLE 7

This example had the same conditions as Example 1 except that 40 parts of Tone and 60 Parts of PETG were used to produce a sheet that was 80 mils thick.

EXAMPLE 8

This example had the same conditions as Example 1 except that 50 parts of Tone and 50 parts of PETG were used to produce a sheet that was 80 mils thick.

EXAMPLE 9

This example had the same conditions as Example 1 except that 60 parts of Tone and 40 parts of PETG were used to produce a sheet that was 70-75 mils thick.

The materials produced from Examples 1-9 were tested for stiffness and resiliency using the Satra test procedures # TM 83. This test is a standard that is used in the footwear industry. The results are shown in Table I below:

TABLE I

| STIFFNESS AND RESILIENCY | | | | | | | | | |
|---|---|---|---|---|---|---|---|---|---|
| | Example No: | | | | | | | | |
| | 1 | 2 | 3 | 4 | 5 | 6 | 7 | 8 | 9 |
| Wt. (g/m$^2$) | 1293 | 1344 | 1317 | 1627 | 1741 | 1867 | 2511 | 2496 | 2236 |
| Thickness (mils) | 40-42 | 41-46 | 42-43 | 52-57 | 54-57 | 60-62 | 80-83 | 80-84 | 73-75 |
| 1$^{st}$ Collapse (kg) | 17 | 16.5 | 11.4 | 19.7 | 26.4 | 37.1 | 63.2 | 51.8 | 43 |
| 10$^{th}$ Collapse (kg) | 12.4 | 9.6 | 7.7 | 14.2 | 16.6 | 24.5 | 40.4 | 38.6 | 28.9 |
| % Resiliency | 73 | 58 | 68 | 72 | 63 | 66 | 64 | 75 | 67 |

Examples 10-25 relate to the process of co-extruding the polymer stiffener and the adhesive material to produce a polymer sheet stiffener in a single extruding step.

EXAMPLE 10

Two WELEX extruders are used in this example along with a WELEX coextrusion block. A sheet die with a maximum gap of 40 mils was used. A 2-¼ inch WELEX extruder is used to extrude the PETG core material with a temperature profile of 325° F., 350° F., 375° F. and 400° F. The die temperature was maintained between 390-410° F. A temperature profile of 325° F., 375° F., 410° F. and 420° F. was also evaluated. PETG in the form of regrind chips was used as the feed to the extruder. The second extruder was a 1-inch WELEX extruder that employed Tone pellets. This second extruder was maintained at a temperature profile of 165° F., 230° F. and 255° F. The PETG was fed into the center of the coextrusion die block and the Tone into the two outer areas. The profile produced was a sheet of 33 mils in thickness that was extruded onto a set of 3 cooling rolls and wound up. The extrusion rate of the PETG was kept constant at 72 #/hr and the extrusion rate of the Tone was varied to give products that had ratios of PETG/Tone of 70/30, 80/20 and 90/10. The 70/30 ratio resulted from an extrusion speed of 72 #/hr of PETG and 30 #/hr of the Tone, whereas the 90/10 ratio had an extrusion speed of 72 #/hr of PETG and 7.8 #/hr of Tone. The Tone formed on both sides of the PETG. Samples of the sheets were placed on a melting point bar apparatus that had varying temperatures and the surface tack of the pieces was measured by feeling them at various temperatures. All samples tested at 60-100° C. (140-212° F.) yielded good tack, which meant that the Tone was on the surface, If The Tone was not there then at these temperatures there would be no tack. Samples of the sheets were taken and placed between a piece of leather and lining material, which was then placed in a mold where the bondline temperature was 70° C. (150° F.), and the materials were compressed. The PETG/Tone material formed an excellent bond to the leather and the lining.

Surprisingly the lower melting point resin did not dissolve in the higher melting point resin and the adhesive still maintained its integrity to form a separate coating on the PETG.

A sample sheet of 31-33 mils was cut into a circle and molded to form a dome looking piece to be tested via the Satra dome testing measurement to determine stiffness and resiliency. Table II reproduces the obtained data:

TABLE II

| STIFFNESS AND RESILIENCY EXAMPLE 10 | |
|---|---|
| Wt. (g/m$^2$) | 1035 |
| Thickness (mils) | 31-33 |
| 1$^{st}$ Collapse (kg) | 15.3 |
| 10$^{th}$ Collapse (kg) | 14.5 |
| % Resiliency | 95 |

EXAMPLE 11

Three extruders were used in this experiment. Two were Crompton Davis Standard 1-¼ inch extruders and one was a 2-½ inch extruder. The larger extruder fed the PETG at a constant rate and the two smaller extruders fed the Tone. The materials were fed into a sheet manifold die where the center received the PETG melt and the two outer layers received the Tone.

The equipment used was as follows:

Extruders: One 2½-inch Davis Standard extruder with a 30/I L/D single stage barrier screw. Five zone heat and cooling. Two 1¼-inch Davis Standard extruders with a 24/1 L/D barrier single stage screw. All extruders did not have gear pumps or static mixers on them. A gravimetric feeder was above the 2½-inch extruder. The two 1¼-inch extruders fed to the side of the die and the 2½-inch fed to the center of the die. All extruders had throat cooling and throat cooled to 50° F.;

Die: Three layer manifold flexible lip die with separate heating on outer manifolds and center as well as lip. The die was an EDI 12 inch wide unit with a coextrusion block for ABA coextrusion. Screen changers on all machines with 20/100/20 mesh packs;

Rolls: Two casting rolls parallel to each other in horizontal plain of 30-inch face with cooling on both rolls;

Thickness monitor: Beta type gauge;

Wind-up station;

Cutting table with paper cutter to cut sheet;

Chiller: for rolls and extruders.

(Note: thickness controlled by die lips and not rolls. Wind up used during start up and each thickness change until reach equilibrium and then bypassed wind up to go to cutting table to cut sheets about 3 feet long.)

The PETG was not dried and was fed into the 2½-inch extruder. The Tone was not dried and was fed into the feed hopper feed to each of the 1¼-inch extruders at PETG Regrind—2½-extruder—start-up at 10 rpm. The extruder was maintained at a temperature of 325° F., 375° F., 400° F., 410° F. and 420° F. The screen changer, clamps and other piping were maintained at 410° F. The output was 46 #/hr. The feed throat was maintained at 50° F. The die was maintained at 400° F. The die lip heater was maintained at 100% and also used an air knife. There were no noticeable lines in the extrudate or the sheet of PETG.

The Tone extruders were set at 150° F., 230° F. and 250° F. and the die at 250° F. The co-extruders were set at 18/11/11 rpms (PETG/Tone A/Tone C) to produce 154#/hr. The rolls temperature was set at 45° F. The die gap was set at 50 mils. The Roll temperature was then raised to 55° F. This produced sheet with a width of 10½ inches wherein the Tone coated section was about 7½ inches wide. The pressure in PETG extruder was 2065 psi, the pressure in the Tone A extruder was 574 psi and the pressure in the Tone C extruder was 387 psi. Roll speed was set at 7.5 fpm. The Melt temperature was set at 397 F. The air knife was placed at the exit of die and helped to cool the sheet before they were transferred to the rolls. This process produced sheet with a thickness of 53-55 mils and a weight of about 1700 g/m$^2$, sheets with a thickness of 51-56 mils and a weight of 1611 g/m$^2$, and sheets with a thickness of 45-48 mils and a weight of about 1500 g/m$^2$. All three materials were tested on a melting point bar and produced good tack at 70-90° C. (158-194° F.).

There was a pressure difference between the two Tone extruders because of the longer run of pipe to the die.

The following examples illustrate the various formulations evaluated and the test results obtained on the finished sheets produced.

EXAMPLE 12

This example was prepared in accordance with Example 11, however, the extrusion rates were reduced to 16/10/10 rpm to produce sheets with a thickness of 40 mils and a weight of about 1300 g/m$^2$. Extrusion pressure was 1896 psi for the PETG and 539 psi and 341 psi for the Tone A and Tone C extruders respectively. The temperature in all the melt pipes was set at 400° F., the die temperature was set at 400° F. and roll speeds were set at 7.5 fpm. This resulted in sheets with a thickness of 11 inches. Circles of sheet had thickness of 42-45 mils and a weight of 1306 g/m$^2$ and a thickness of 40 mils and a weight of 1273 g/m$^2$.

EXAMPLE 13

This example was prepared in accordance with Example 12, however, the extrusion rates were reduced to 14/9/9 rpm to produce a thickness of 35 mils and a weight of 1000 g/m$^2$. A thickness of 36-38 mils produced a weight of 1131 g/m$^2$. This produced a very good bond on the melting point bar and was also tried between two pieces of lining. Extrusion pressure on the PETG extruder was 1678 psi, the Tone A was 499 psi and the Tone C was 313 psi.

EXAMPLE 14

This example was prepared in accordance with Example 13, however, the extrusion rates were reduced to 12/8/8 rpm to produce sheets of 30 mils thickness. The extruder pressure was 1643 psi for the PETG, and 472 psi and 279 psi for the A and C Tone extruders respectively. The melt temperature was set at 396° F. The roll speed remained at 7.5 fpm. The die gap was set at 30 mils. This produced sheets with a thickness of 32 mils and a weight of 964 g/m$^2$. Sheets were also produced with a thickness of 25-28 mils and a weight of 762 g/m$^2$.

EXAMPLE 15

This example was prepared in accordance with Example 14, however, the extrusion rates were reduced to 10/7/7 rpm to obtain a sheet with a thickness of 23-25 mils. This produced very good bonds when tested on the melting point bar. The extrusion pressure for the PETG extruder was 1314 psi and the Tone A and Tone C extruders were at 432 psi and 243 psi respectively. The melt temperature was set at 396° F. and the roll speed remained at 7.5 fpm.

EXAMPLE 16

This example was prepared in accordance with Example 15, however, the extrusion rates were reduced to 8/6/6 rpm to obtain sheets with a 20 mils thickness. Also, the extrusion rates were set at 9/6/6 rpm to obtain sheets with a thickness of around 17-20 mils, this produced very good bonds when tested on the melting point bar. At a thickness of 16-22 mils sheets were produced with a weight of 508 g/m$^2$. Table III and IV below shows the dome test results for Example 11-16 above.

TABLE III

Dome Test Results for a Examples 11-16

| | Material PETG/Tone | | | | |
|---|---|---|---|---|---|
| | 90/10 | 90/10 | 90/10 | 90/10 | 90/10 |
| Thickness (mils) | 32 | 40 | 17 | 41-42 | 49-50 |
| Thickness (mm) | 0.81 | 1.01 | 0.43 | 1.04-1.07 | 1.24-1.27 |
| Weight (kg/m$^2$) | 964 | 1273 | 523 | 1297 | 1592 |
| 1$^{st}$ Collapse (kg) | 10.1 | 20.4 | 3.2 | 20.0 | 43.1 |
| 10$^{th}$ Collapse (kg) | 10.0 | 16.2 | 2.3 | 16.3 | 25.8 |
| % Resiliency | 99 | 79 | 72 | 82 | 60 |
| Mold Time | 7 | 7 | 6 | 6 | 9 |

TABLE IV

Dome Test Results for a Examples 11-16

| | Material PETG/Tone | | | | |
|---|---|---|---|---|---|
| | 90/10 | 90/10 | 90/10 | 90/10 | 90/10 |
| Thickness (mils) | 34-37 | 46-50 | 47-51 | 36-38 | 36-39 |
| Thickness (mm) | 0.86-0.94 | 1.17-1.27 | 1.19-1.29 | 0.91-0.96 | 0.91-0.99 |
| Weight (kg/m$^2$) | 1089 | 1561 | 1541 | 1152 | 1164 |
| 1$^{st}$ Collapse (kg) | 12.0 | 31.6 | 35.5 | 16.1 | 17.0 |
| 10$^{th}$ Collapse (kg) | 11.6 | 24.2 | 25.6 | 15.1 | 15.1 |
| % Resiliency | 997 | 77 | 72 | 94 | 89 |
| Mold Time | 7 | 7 | 9 | 7 | 7 |

EXAMPLE 17

This example was prepared in accordance with Example 16. The extruders remained at 9/7/7 rpm, but the die temperature was raised to 450° F. and the PETG extruder temperature profile was set at 325° F., 425° F., 450° F., 450° F. and 450° F. The extrusion pressure was 1394 psi for the PETG extruder and 440 psi and 250 psi for the Tone A and Tone C extruders respectively. The Tone extruders remained at the prior temperature profiles. This reduced the die lines from the Tone. Also, this did not result in the Tone mixing into the PETG. Additionally, this yielded a good viscosity for the Tone, there was no roll sticking and the material had good bonding characteristics.

EXAMPLE 18

This example was prepared in accordance with Example 17, however at higher temperatures the edges of the sheet from the PETG got very runny and the extrusion rates were set to 14/9/9 rpm to obtain 35-mil sheets. This produced no die score lines.

EXAMPLE 19

This example was prepared in accordance with Example 18, however polyethylene terephthalate (PET) (predried) was used in place of PETG. The temperature profile on the extruder (which had previously been used for the PETG) was increased to 325° F., 425° F., 450° F., 450° F. and 450° F. and the die temperature was set at 450° F. The extruders were set at 14/9/9 rpms. The temperature profile for the Tone extruders was set at 175° F., 350° F. and 350° F. and the temperature for the melt pipe was set at 400° F. This produced sheets with thicknesses of 16-20 mils and 22-25 mils. This produced non-uniform coating and no die score lines from the Tone.

EXAMPLE 20

This example was prepared in accordance with Example 19, however the PET extruder temperature was increased to 500° F. and the die temperature was increased to 500° F. The extrusion rate was set at 24/12/12 rpms, the extrusion pressures of the PET was 193 psi, and 591 psi and 354 psi for the Tone A and Tone C extruders respectively. The melt temperature was set at 300° F. The flow was not good, but there were no score lines in the Tone coating.

EXAMPLE 21

This example was prepared in accordance with Example 20, however the temperature was increased to 550° F. for the die and for the co-extrusion block. The PET extruder temperature profile was set at 450° F., 500° F., 500° F., 500° F. and 500° F. The PET melt pipe temperature was set at 550° F. The temperature profile for the Tone extruders were set at 175° F., 350° F. and 350° F., and the pipe temperature was set at 300° F. The extruders were set at 14/9/9 rpms. The Tone exiting the lip was somewhere between 300° F. and 550° F. and showed no score die lines.

EXAMPLE 22

This example was prepared in accordance with Example 21, however the extruders flow rate was increased to 24/15/15 rpms resulting in 97#/hr total output. This rate was then reduced to 24/12/12 rpms and the sheets were placed on casting rolls. The extruder pressure was 144 psi for the PET and 596 psi and 340 psi for the Tone A and Tone C extruders respectively. The roll speed remained at 7.5 fpm. This resulted in a good surface look and very good Tone coating with very good bonding. The gauge was around 29/31 mils and 1000 g/m$^2$. The very high temperature did not hurt the flow of the Tone and eliminated the Tone die score lines. The sheet looked very good and resulted in a width of 10⅝ inches, where the Tone coated section was 9⅛ inches. Material with a thickness of 35/36 mils had a weight of around 1200 g/m². With the rolls temperature set at 55° F. there was no sticking. The coated sections were tough and flexible. The total output was around 112 #/hr with a Tone percent of around 20%. The Gauge was 34-36 mils and the weight was 1118 g/m². Table V below shows the dome test results for Example 22.

TABLE V

| Dome Test Results For a Sample Molded at 180° C. for 2 minutes | |
| --- | --- |
| PET/TONE | 80/20 |
| Thickness (mils) | 33-34 |
| Thickness (mm) | 0.84-0.86 |
| Weight (kg/m²) | 1081 |
| 1$^{st}$ Collapse (kg) | 13.1 |
| 10$^{th}$ Collapse (kg) | 12.9 |
| % Resiliency | 98 |

EXAMPLE 23

An ABA structure was made with Eastman GP001 polyester with a softening point of 74° C. (165° F.) and EMAC® 2260 ethylene methyl acrylate polymer. The adhesive two outer layers were the EMAC and the core was the GP001. A three-extruder coextrusion block system was used. The GP001 was extruded through a 2 inch Davis Standard extruder at 430° F. and the EMAC® through two 1¼ inch Davis Standard extruders at 450° F. The die temperature was 420° F. and a 22-inch die was used. The GP001 was predried before extrusion. The extrudate was cast onto a three roll casting system with the extrudate going onto the middle roll. Adjusting the die and the middle extruder's speed formed various sheet thicknesses. Sheets were produced that were 20, 25, 29, 35, 45 and 50 mils thick. The table below lists the dome test results on the sheets produced. The total of the A layers represented 18% of the total thickness of the finished sheet. The Dome test results of 5 molded at 95° C. for 8 minutes in accordance with Example 23 are shown in Table VI below. The dome test results of 1 sample molded at 100° C. for seven minutes in accordance with Example 23 is shown in Table VII below.

TABLE VI

| Dome Test Results for a Sample Molded at 95° C. for 8 Minutes | | | | | |
| --- | --- | --- | --- | --- | --- |
| | Sample | | | | |
| | A | B | C | D | E |
| Thickness (mils) | 19 | 24-25 | 27-29 | 44-48 | 48-50 |
| Weight (kg/m²) | 587 | 761 | 874 | 1436 | 1529 |
| 1$^{st}$ Collapse (kg) | 2.2 | 4.4 | 6.7 | 30.0 | 37.3 |
| 10$^{th}$ Collapse (kg) | 2.1 | 4.1 | 6.4 | 21.0 | 21.8 |
| % Resiliency | 95 | 93 | 96 | 70 | 58 |

TABLE VII

| Dome Test Results For a Sample Molded at 100° C. for 7 minutes | |
| --- | --- |
| Sample | 35 |
| Thickness (mils) | 35-38 |
| Weight (kg/m²) | 1140 |
| 1$^{st}$ Collapse (kg) | 15.1 |
| 10$^{th}$ Collapse (kg) | 14.3 |
| % Resiliency | 95 |

EXAMPLE 24

This example was prepared in accordance with Example 23, except that the ABA structure used as the "A" layers a blend of 55% Tone and 45% GP001. The dome test data is recorded in Table VIII below. All samples displayed good adhesive properties.

TABLE VIII

| Dome Test Results For Samples Molded at 100° C. for 7 Minutes | | | |
| --- | --- | --- | --- |
| | Sample | | |
| | A | B | C |
| Thickness (mils) | 25-26 | 34-36 | 45-47 |
| Thickness (mm) | 0.63-0.66 | 0.86-0.91 | 1.14-1.19 |
| Weight (kg/m²) | 820 | 1116 | 1427 |
| 1$^{st}$ Collapse (kg) | 8.9 | 18 | 34 |
| 10$^{th}$ Collapse (kg) | 8.4 | 15.8 | 23.6 |
| % Resiliency | 94 | 88 | 69 |

EXAMPLE 25

This example uses the same conditions and equipment as in Example 23, but the "A" layers are a blend of 55% Tone and 45% EMAC 2260. The dome data is shown in Table IX below. All samples showed good adhesive properties.

TABLE IX

| Dome Test Results For Samples Molded at 100° C. for 7 Minutes | | | |
| --- | --- | --- | --- |
| | Sample | | |
| | D | E | F |
| Thickness (mils) | 45-47 | 35-36 | 25-26 |
| Thickness (mm) | 1.14-1.19 | 0.89-0.91 | 0.63-0.66 |
| Weight (kg/m²) | 1399 | 1108 | 770 |
| 1$^{st}$ Collapse (kg) | 27.3 | 14.2 | 5.1 |
| 10$^{th}$ Collapse (kg) | 20.2 | 12.6 | 6.1 |
| % Resiliency | 74 | 89 | 119 |

While certain preferred and alternative embodiments of the invention have been set forth for purposes of disclosing the invention, modifications to the disclosed embodiments may occur to those who are skilled in the art. Accordingly, the appended claims are intended to cover all embodiments of the invention and modifications thereof which do not depart from the spirit and scope of the invention.

What is claimed is:

1. A resilient footwear stiffener for retaining a shape of a heel or toe portion of footwear, the stiffener comprising a polyethylene terephthalate glycol copolyester layer and at least one low melting point plastic adhesive resin layer coextruded on at least one side of the polyethylene terephthalate glycol copolyester layer so that said low melting point plastic adhesive resin is not fully dissolved in the polyethylene terephthalate glycol copolyester, wherein said low melting point plastic adhesive resin has a melting point below 85° C. and wherein said low melting point plastic adhesive resin layer or layers is no more than 20% of the total thickness of the coextruded sheet.

2. The resilient footwear stiffener of claim 1, wherein the low melting point plastic adhesive resin is a polycaprolactone resin.

3. The resilient footwear stiffener of claim 2, wherein the ratio of polyethylene terephthalate glycol copolyester/polycaprolactone is from about 70/30 to about 95/5.

4. The resilient footwear stiffener of claim 1, wherein low melting point plastic resin and said polyethylene terephthalate glycol copolyester are coextruded through either a coextrusion block or a manifold sheeting die.

5. A resilient footwear stiffener for retaining a shape of a heel or toe portion of footwear, the stiffener comprising a polyethylene terephthalate glycol copolyester layer coextruded with an outer component comprising a low melting point plastic adhesive resin layer on two sides of the polyethylene terephthalate glycol copolyester layer; wherein said low melting point plastic adhesive resin of the outer component is not fully dissolved in the polyethylene terephthalate glycol copolyester layer, wherein said low melting point plastic adhesive resin has a melting point below 85° C. and wherein said low melting point plastic adhesive resin layers are no more than 20% of the total thickness of the coextruded sheet.

6. The resilient footwear stiffener of claim 5, wherein the low melting point adhesive resin is a polycaprolactone resin.

7. The resilient footwear stiffener of claim 6, wherein the ratio of polyethylene terephthalate glycol copolyester/polycaprolactone is from about 70/30 to about 95/5.

8. The resilient footwear stiffener of claim 5, wherein low melting point plastic resin and said polyethylene terephthalate glycol copolyester are coextruded through either a coextrusion block or a manifold sheeting die.

9. The resilient footwear stiffener of claim 5, wherein the stiffener is a heel counter and further comprises a layer of lining material adhered to a first of the layers of low melting point plastic adhesive resin and a second layer adhered to a second of the layers of the low melting point plastic adhesive, wherein the second layer is leather.

10. The resilient footwear stiffener of claim 9 wherein the stiffener is molded into a desired shape for the heel counter.

\* \* \* \* \*